United States Patent
Chen et al.

(10) Patent No.: US 10,962,475 B2
(45) Date of Patent: Mar. 30, 2021

(54) SENSOR BASED ON GRATING SLIT WAVEGUIDE COMPOSITE STRUCTURE

(71) Applicant: SUZHOU INSTI. OF NANO-TECH AND NANO-BIONICS(SINANO), CHINESE ACADEMY OF SCIENCES, Jiangsu (CN)

(72) Inventors: Qin Chen, Jiangsu (CN); Li Liang, Jiangsu (CN); Long Wen, Jiangsu (CN); Xin Hu, Jiangsu (CN)

(73) Assignee: SUZHOU INSTITUTE OF NANO-TECH AND NANO-BIONICS(SINANO), CHINESE ACADEMY OF SCIENCES, Jiangsu (CN)

( * ) Notice: Subject to any disclaimer, the term of this patent is extended or adjusted under 35 U.S.C. 154(b) by 0 days.

(21) Appl. No.: 16/631,122

(22) PCT Filed: Aug. 17, 2018

(86) PCT No.: PCT/CN2018/101067
§ 371 (c)(1),
(2) Date: Jan. 14, 2020

(87) PCT Pub. No.: WO2020/024337
PCT Pub. Date: Feb. 6, 2020

(65) Prior Publication Data
US 2021/0063308 A1    Mar. 4, 2021

(30) Foreign Application Priority Data
Aug. 1, 2018 (CN) .......................... 201810865472.1

(51) Int. Cl.
*G01N 21/45* (2006.01)

(52) U.S. Cl.
CPC ....... *G01N 21/45* (2013.01); *G01N 2021/458* (2013.01)

(58) Field of Classification Search
CPC .......................... G01N 21/45; G01N 2021/458
See application file for complete search history.

(56) References Cited

U.S. PATENT DOCUMENTS

| | | | |
|---|---|---|---|
| 2009/0079976 A1* | 3/2009 | Cunningham | G01N 21/7743 356/246 |
| 2014/0218738 A1* | 8/2014 | Bartoli | G01N 21/7703 356/450 |

* cited by examiner

*Primary Examiner* — Jonathan M Hansen
(74) *Attorney, Agent, or Firm* — Nelson Mullins Riley & Scarborough LLP; Kongsik Kim, Esq.

(57) ABSTRACT

A sensor including: a substrate including a first surface and a second surface opposing to each other, the first surface being recessed to form a first groove, and the substrate further including at least two through holes penetrating through the second surface and a bottom surface of the first groove; a dielectric layer disposed to cover the first surface, and opposing to the first groove; a metal layer disposed on the bottom surface of the first groove and avoiding openings of the through holes on the bottom surface of the first groove, wherein the dielectric layer, the metal layer and an interval between the dielectric layer and the metal layer form a slit optical waveguide; and a grating formed on the dielectric layer, wherein the grating is used to implement wave vector matching of an incident light with a mode of the slit optical waveguide.

17 Claims, 8 Drawing Sheets

SENSOR BASED ON GRATING SLIT WAVEGUIDE COMPOSITE STRUCTURE

CROSS-REFERENCES TO RELATED APPLICATIONS

This application is a U.S. national phase application, pursuant to 35 U.S.C. § 371, of PCT/CN2018/101067, filed Aug. 17, 2018, designating the United States, which claims priority to Chinese Application No. 201810865472.1, filed Aug. 1, 2018. The entire contents of the aforementioned patent applications are incorporated herein by this reference.

TECHNICAL FIELD

The present disclosure relates to sensor technology, and in particular, relates to a sensor based on a grating slit waveguide composite structure.

RELATED ART

At present, there is an urgent need for high-sensitivity sensors in the fields of biomedicine, environmental monitoring, food safety and even national defense. An optical refractive index sensor has characteristics of high sensitivity, anti-electromagnetic interference, non-marking, etc., and thus has been widely concerned and vigorously developed. An optical resonance structure is generally used to enhance sensing sensitivity, and a change in a measured object is sensed by testing frequency shift and intensity variation of a resonance peak. Under the same conditions of change in the measured object, the sensor has greater frequency shift and intensity variation, which represents that the sensor has higher sensing sensitivity, and a narrower resonance peak (i.e., a higher quality factor) is also beneficial to increase a detection limit, and thus improvement in a figure of merit of the refractive index sensor requires higher sensing sensitivity and a higher quality factor.

In Volume 4 of the journal of *Nature Photonics* in 2009 (please refer to page 46), an optical refractive index sensor based on a microdisk-structured resonator is reported, wherein a quality factor of such a structure is as high as $10^8$, and nanoparticles with a radius of only 30 nm may be measured. However, since light field distribution in a resonance mode is concentrated inside the microdisk, and contact area between the light field and external measured substances is very small, the sensing sensitivity of the optical refractive index sensor is very low, which limits the figure of merit thereof.

In Issue 7 of the journal of *Nature Nanotechnology* in 2012 (please refer to page 379), an optical refractive index sensor based on metal nanoparticles is reported. Such a structure has a strong local effect of light field and greatly enhances interaction of light with a measured object, which implements non-absorbent single molecule detection. However, a quality factor of a resonance mode of such a structure is merely over ten, which severely limits improvement of the figure of merit thereof.

In Issue 10 of *Laser & Photonics Reviews* in 2016 (please refer to page 962), a sensor based on a meta-material absorber is reported. The sensor implements almost full spatial coincidence of a light field and a measured object by integrating a microfluidic channel inside the absorber, and has ultra-high sensitivity of 3.5 THz/RIU. However, the quality factor of the sensor is only about 10, which also limits figure of merit thereof. Accordingly, the prior art represented by the above examples is difficult to implement coexistence of high sensing sensitivity and high quality factor, which greatly limits the improvement of the figure of merit of the optical refractive index sensor.

SUMMARY

With respect to deficiencies of the prior art, an object of the present disclosure is to provide a sensor based on a grating slit waveguide composite structure to implement an optical refractive index sensor having high quality factor and high sensing sensitivity simultaneously and obtain an ultra-high figure of merit.

In order to achieve the above purpose, the present disclosure adopts a technical solution as follows:

In one general aspect, the present disclosure provides a sensor based on a grating slit waveguide composite structure, the sensor including:

a substrate including a first surface and a second surface opposing to each other, the first surface being recessed to form a first groove, and the substrate further including at least two through holes penetrating through the second surface and a bottom surface of the first groove;

a dielectric layer disposed to cover the first surface, and opposing to the first groove;

a metal layer disposed on the bottom surface of the first groove and avoiding openings of the through holes on the bottom surface of the first groove, wherein the dielectric layer, the metal layer and an interval between the dielectric layer and the metal layer form a slit optical waveguide; and a grating formed on the dielectric layer, or on the bottom surface of the first groove, or formed by the metal layer, wherein the grating is used to implement wave vector matching of an incident light with a mode of the slit optical waveguide.

As one of the embodiments, when the grating is formed on the dielectric layer, a surface of the dielectric layer facing against the first groove is provide with a plurality of second grooves, and the plurality of second grooves are disposed to be spaced apart from each other at an equal interval to form the grating.

As one of the embodiments, when the grating is formed on the bottom surface of the first groove, the bottom surface of the first groove is provide with a plurality of third grooves, the plurality of third grooves are disposed to be spaced apart from each other at an equal interval to form the grating, and the metal layer successively covers the bottom surface of the first groove and groove surfaces of the third grooves.

As one of the embodiments, when the grating is formed by the metal layer, the metal layer includes a plurality of metal blocks disposed on the bottom surface of the first groove, and the plurality of metal blocks are disposed to be spaced apart from each other at an equal interval to form the grating.

As one of the embodiments, a material of the substrate includes at least one of quartz, polydimethylsiloxane, polypropylene, polyethylene, polytetrafluoroethylene, polymethylpentene, and polyimide.

As one of the embodiments, a material of the dielectric layer includes at least one of silicon, gallium arsenide, quartz, polydimethylsiloxane, polypropylene, polyethylene, polytetrafluoroethylene, polymethylpentene and polyimide.

As one of the embodiments, a material of the metal layer includes at least one of gold, silver, copper, aluminum, titanium, nickel, and chromium; and/or a thickness of the metal layer is 0.05 μm~0.5 μm.

As one of the embodiments, the grating has a one-dimensional periodic structure or a two-dimensional periodic structure.

As one of the embodiments, a grating period of the grating is 0.2 to 2 times an operating wavelength of the sensor; and/or a thickness of the grating is 0.03 µm~10 µm.

As one of the embodiments, an interval between the dielectric layer and the metal layer is 0.01 to 0.2 times the operating wavelength of the sensor.

When the grating is formed on the dielectric layer or the grating is formed on the bottom surface of the first groove, the metal layer covers a remaining portion of the bottom surface of the first groove except the opening.

In comparison with the prior art, advantages of the present disclosure at least lie in:

(1) by assembling the metal layer and the dielectric layer and forming a slit therebetween (i.e., an interval between the metal layer and the dielectric layer, that is, a microfluidic channel), obtaining a slit optical waveguide having a light field highly localized in the slit, and using the slit as a microfluidic channel through which a measured object flowing into and out, so that the highly localized light field sufficiently spatially overlaps, i.e., interacts with, the measured object, thereby improving the sensing sensitivity; meanwhile, (2) resonantly coupling the incident light and the mode of the slit optical wave guide using the grating, implementing resonant transmission or reflection with very low loss by adjusting the grating and the wave guide structure, thereby improving the quality factor. Finally, high sensing sensitivity and high quality factor are achieved simultaneously in the same sensor structure, thereby achieving extremely high figure of merit.

BRIEF DESCRIPTION OF THE DRAWINGS

In order to illustrate the technical solutions in the embodiments of the present disclosure more clearly, drawings that need to be used in the description of the embodiments or the prior art will be briefly described below. Obviously, the drawings described in the following description are only some of embodiments of the present disclosure. For those ordinarily skilled in the art, other drawings may be obtained from those drawings without exerting any creative effort.

DETAILED DESCRIPTION

Figure 1:
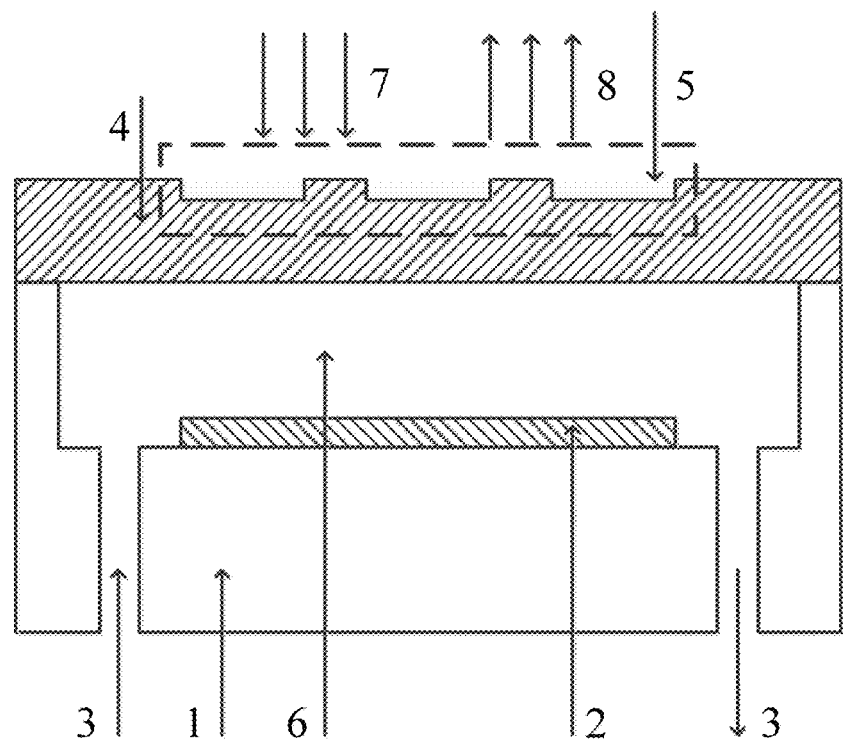
FIG. 1 is a schematic cross-sectional structural diagram of a sensor based on a grating slit waveguide composite structure according to Embodiment 1 of the present disclosure.

The technical solutions in the embodiments of the present disclosure will be described in details in conjunction with the drawings in the embodiments of the present disclosure, and obviously the described embodiments are only a part of the embodiments instead all of the embodiments of the present disclosure. Based on the embodiments of the present disclosure, all the other embodiments acquired by those ordinarily skilled in the art without exerting any creative effort fall within a protection scope of the present disclosure.

A sensor based on a grating slit waveguide composite structure according to the present embodiment at least includes a substrate, a metal layer, a grating and a dielectric layer. The substrate is provided with a first groove, the metal layer covers a bottom surface of the first groove, the dielectric layer covers the substrate and opposes to the first groove, there is a certain interval between the metal layer and the dielectric layer, the interval forms a microfluidic channel through which a liquid flowing, and the metal layer, the dielectric layer and the interval therebetween (i.e., the microfluidic channel) form a slit optical waveguide, which has a character that a wave guide mode is localized within the microfluidic channel. Obviously, the substrate is provided with a through hole penetrating to the microfluidic channel, and the through hole is used to introduce a liquid.

The grating is used to assist in implementing wave vector matching of an incident light of a set frequency with a mode of the slit optical waveguide to thereby obtain resonance coupling therebetween. Thus, an auxiliary function may be achieved no matter the grating of the present disclosure may be formed on the dielectric layer, or on a bottom surface of the first groove (i.e., on the substrate), or formed by the metal layer. In a process of manufacturing the grating, if the grating is too thin, a function thereof is very weak, and if the grating is too thick, a material may be wasted, and a loss is increased. Thus, preferably, a thickness of the grating is 0.03 µm~10 µm. In addition, the grating is in a periodic structure, and its period is preferably 0.2 to 2 times an operating wavelength of the sensor, and the grating may be in a one-dimensional or two-dimensional planar periodic structure.

A material of the metal layer may be any one or a combination of two or more of gold, silver, copper, aluminum, titanium, nickel, and chromium, and preferably a thickness of the metal layer is 0.05 µm to 0.5 µm.

A material of the dielectric layer includes any one or a combination of two or more of materials having low absorption loss, such as silicon, gallium arsenide, quartz, polydimethylsiloxane, polypropylene, polyethylene, polytetrafluoroethylene, polymethylpentene and polyimide etc., and preferably may be a single one thereof.

A material of the substrate includes any one of materials having low refractive index, such as quartz, polydimethylsiloxane, polypropylene, polyethylene, polytetrafluoroethylene, polymethylpentene, and polyimide. It should be illustrated that when the grating is a transmission grating disposed on the substrate, the material of the substrate is required to be a material having low refractive index, but no limitation is made to other types.

The interval between the metal layer and the dielectric layer may form a closed microfluidic channel. During a practical application process, it is discovered that if the microfluidic channel is too small, a fluid is not easily injected, and contact between a light field and a fluid may be decreased; but if the microfluidic channel is too large, it may cause too many modes in the waveguide, there may be too many resonance peaks, and it is not easy to detect shift of a specific resonance peak. Thus, preferably, a height of the microfluidic channel of the present embodiment is 0.01 to 0.2 times the operating wavelength of the sensor.

According to the setting of the above sensor structure, the sensor based on the grating slit waveguide composite structure according to the present embodiment may obtain a quality factor of greater than 1000. Furthermore, a figure of merit of the sensor is greater than or equal to 140.

The technical solutions of the present disclosure will be illustrated in details in conjunction with several preferred embodiments and related drawings hereinafter.

Embodiment 1

Figure 2:
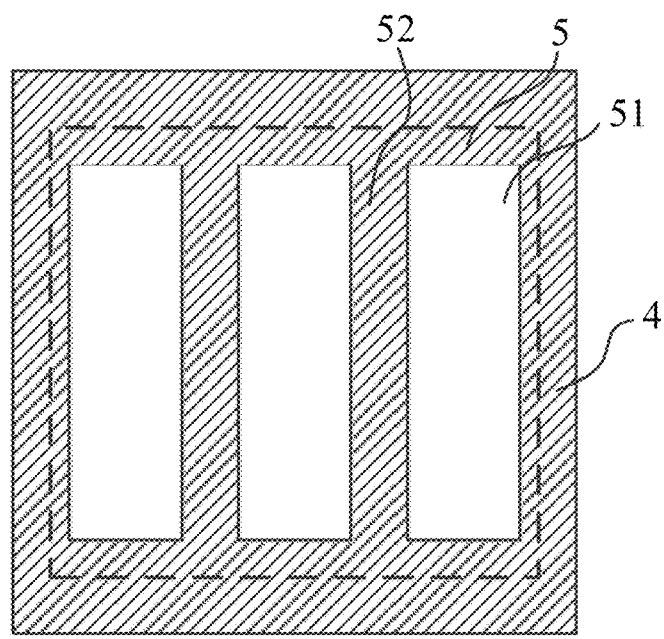
FIG. 2 is a schematic top plan structural diagram of the grating portion of FIG. 1.

Referring to FIGS. 1 and 2, as one of the forming methods of the above grating, the grating of the present embodiment is a reflective grating formed on the dielectric layer. Specifically, a manufacturing process of the sensor based on the grating slit waveguide composite structure of the present embodiment is described as follows:

with reference to FIG. 1, a first groove of which a center portion is recessed is disposed on a substrate 1 of the present embodiment through micromachining; and a successive metal layer 2 is disposed on a bottom surface of the first groove.

Through holes 3 penetrating through the substrate 1 are disposed at an edge of the bottom surface of the first groove, and the through holes 3 may be a liquid input port and a liquid output port, respectively. It should be understood that since the input port and the output port are used for inputting and outputting a measured liquid, they must communicate with a microfluidic channel 6, and a communicating may be performed with two manners: one is avoiding the input port and the output port while manufacturing the successive metal layer 2; and the other one may dispose the input port and the output port after the manufacturing of the successive metal layer 2 is completed and make the input port and the output port directly penetrate through the metal layer 2 to communicate with the microfluidic channel 6.

In conjunction with what shown in FIGS. 1 and 2, a grating 5 is disposed on a surface of a dielectric layer 4. The grating 5 includes a plurality of second grooves 51 etched on the upper surface of the dielectric layer 4, and the plurality of second grooves 51 are disposed to be spaced apart from each other at an equal interval to form a reflective grating on the surface of the dielectric layer 4. An incident light 7 is subjected to reflecting to form a reflected light 8. Necessarily, a protrusion 52 is formed between each two adjacent second grooves 51, thus, a plurality of protrusions 52 with an equal interval therebetween are formed between the plurality of second grooves 51, wherein the formed grating 5 opposes the metal layer 2.

Finally, a surface of the dielectric layer 4 far away from the grating 5 and the surface of the substrate 1 provided with the first recessed groove are assembled, and an interval is formed between the metal layer 2 and the dielectric layer 4, that is, the microfluidic channel 6 is formed, thereby completing the manufacturing of the entire sensor.

Preferably, referring to FIG. 1, a material of the substrate 1 of the present embodiment may adopt silicon; a material of the metal layer 2 may adopt copper, and a thickness of the metal layer 2 is 0.2 µm; a material of the dielectric layer 4 may adopt silicon, a thickness of the dielectric layer 4 is 45 µm (without including the thickness of the grating), and the dielectric layer 4 may be manufactured on the basis of a silicon sheet or a silicon-on-insulator (SOI); the protrusions 52 of the grating are formed on the dielectric layer 4 and also made of a silicon material, of which a height is 5 µm, and referring to what is shown in FIG. 2, the grating 5 of the present embodiment adopts a one-dimensional periodic structure, and a period of the grating 5 is 160 µm, wherein a width of the protrusion 52 between the two adjacent second grooves 51 (i.e., a width of a granting strip) is 40 µm; and a height of the microfluidic channel 6 is 20 µm.

Figure 3A:
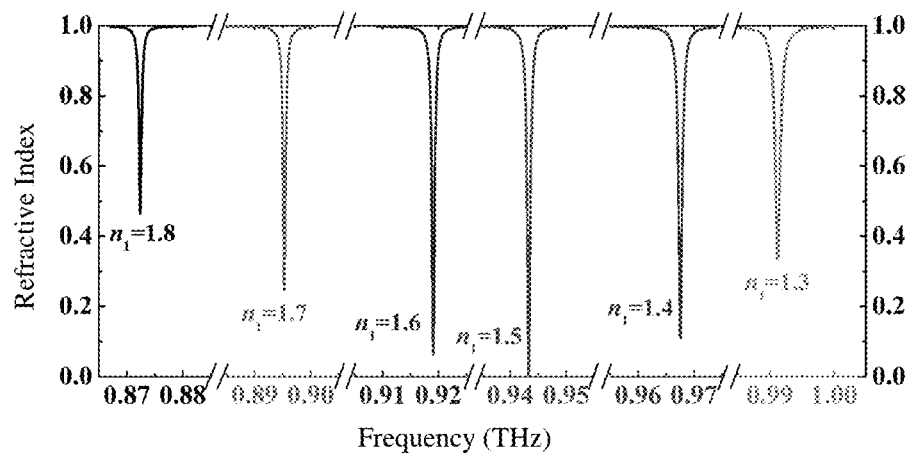
FIG. 3(a) is a reflection spectrum calculated by the sensor based on the grating slit waveguide composite structure according to Embodiment 1 of the present disclosure and corresponding to the measured liquids having different refractive indexes $n_1$.

FIG. 3(a) is a reflection spectrum calculated by the sensor of the present embodiment in the case where the measured liquids having different refractive indexes $n_1$ are in the microfluidic channel 6, and reflective indexes 1.3 to 1.8 cover a range of most commonly used liquid measured objects. It may be seen that there are very narrow resonance peaks in the reflection spectrum, and the quality factor thereof is above 1000. For example, taking a liquid having a refractive index $n_1$=1.5 as an example, a center frequency $f_0$ of a resonance peak is 0.94 THz, and a full width at half maximum FWHM of the resonance peak is $6.25 \times 10^{-4}$ THz. Since a quality factor Q is a ratio of the center frequency $f_0$ of the resonance peak to the FWHM of the resonance peak, that is, $Q = f_0/FWHM$, when a refractive index of a liquid is $n_1$=1.5, the obtained quality factor Q is 1504, which is much greater than that of current optical sensors based on the mechanisms such as surface plasmons and metamaterials.

Figure 3B:
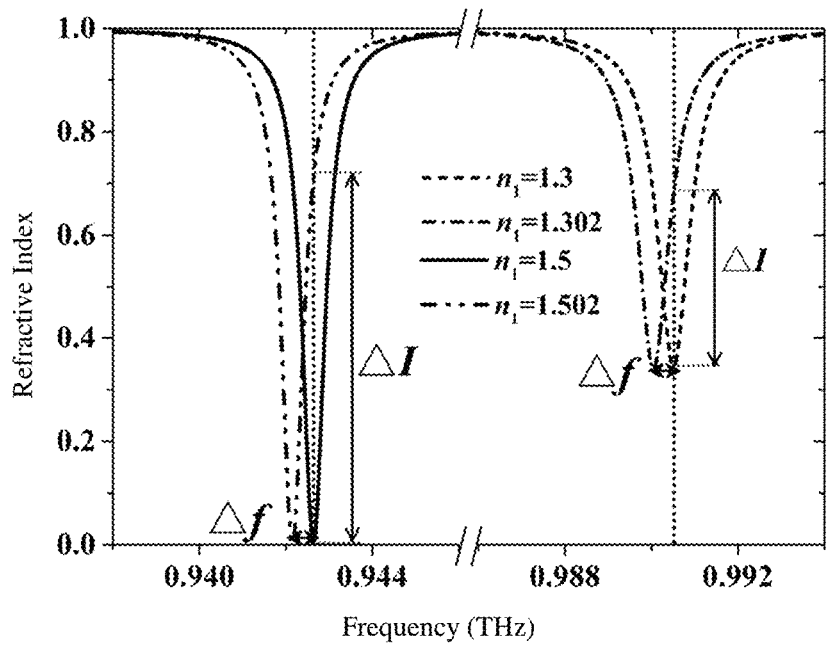
FIG. 3(b) is a reflection spectrum calculated by the sensor based on the grating slit waveguide composite structure according to Embodiment 1 of the present disclosure and corresponding to the measured liquids having a change of a refractive index of 0.02 with respect to $n_1=1.3$ and 1.5.

Referring to FIG. 3(b), as for further obtaining frequency shift sensing sensitivity and strength sensing sensitivity, they are obtained through a minor change in a refractive index of a measured liquid in the present embodiment, and when the micro change (i.e., a change in a refractive index) is 0.002, an obvious frequency shift of a resonance peak may be seen, wherein a resonance frequency change is indicated by Δf and a spectral intensity change is indicated by ΔI. An optical sensor has two kinds of sensing manners, wherein one is sensing through a spectral peak shift, a frequency shift sensing sensitivity $S_f$ thereof is a ratio of the resonance frequency change Δf to a refractive index change Δn, that is, $S_f=\Delta f/\Delta n$; and the other one is sensing through a spectral intensity change, a strength sensing sensitivity $S_I$ thereof is a ratio of the spectral intensity change ΔI to the refractive index change Δn, that is, $S_I=\Delta I/\Delta n$. After calculation, when $n_1=1.3$ and 1.5, and a micro change (i.e., a change in a refractive index) is 0.002, a frequency shift sensing sensitivity is 232 GHz/RIU and 248.5 GHz/RIU (RIU represents each refractive index unit), respectively, and a strength sensing sensitivity is 170/RIU and 350/RIU, respectively. In particular, taking $n_1=1.3$ as an example for illustration, when $n_1=1.3$ and 1.302, a center frequencies of a resonance peak are 990.510 GHz and 990.046 GHz, respectively; and at a center frequency of 990.510 GHz of a resonance peak when $n_1=1.3$, a strengths when $n_1=1.3$ and 1.302 are 0.34 and 0.68, respectively; thus, the frequency shift sensing sensitivity $S_f$ and the strength sensing sensitivity $S_I$ obtained by calculation are 232 GHz/RIU and 170/RIU, respectively.

At the same time, the figure of merit (FOM) of the present embodiment exceeds 250, wherein an FOM is a ratio of a frequency shift sensing sensitivity $S_f$ to an FWHM of a resonance peak, that is, FOM=$S_f$/FWHM, i.e., FOM=($S_f\times$Q)/$f_0$. In particular, taking $n_1=1.5$ as an example, $S_f$=248.5 GHz/RIU, Q=1504, and $f_0$=0.94 THz, thus, FOM=397.6 is obtained, and the value reaches 40 times the ultramaterial sensor reported on page 962 of Issue 10, *Laser & Photonics Reviews* in 2009.

Figure 3C:
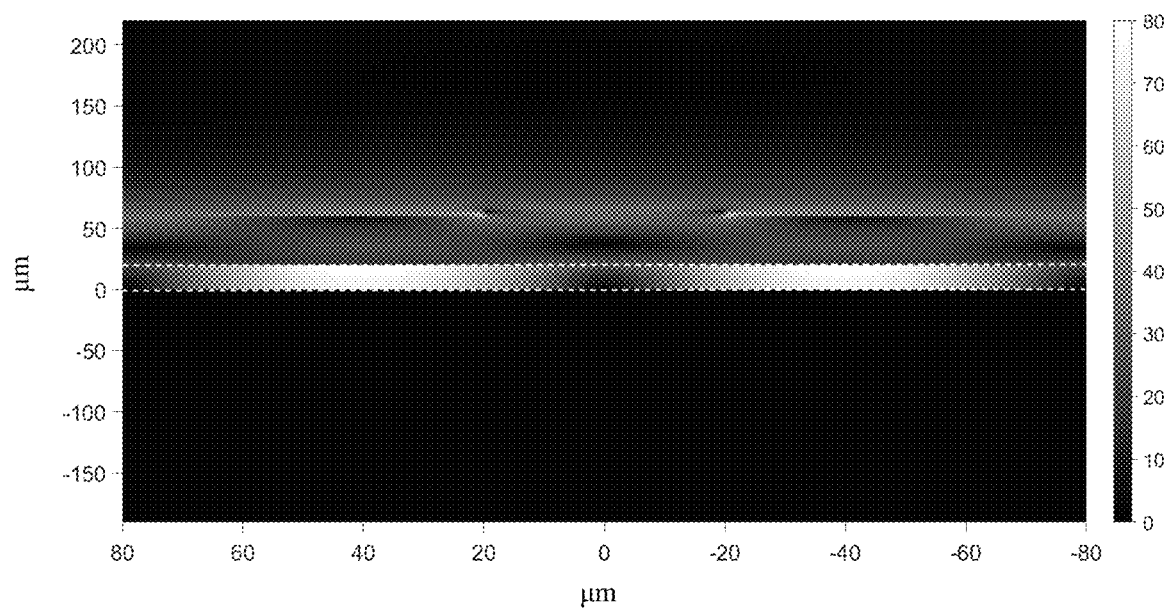
FIG. 3(c) is spatial distribution of an electric field density corresponding to a resonance peak of the sensor structure based on the grating slit waveguide composite structure according to Embodiment 1 of the present disclosure when $n_1=1.5$.

FIG. 3(c) is spatial distribution of an electric field density corresponding to a resonance peak when $n_1=1.5$, wherein a portion within white dotted lines is a microfluidic channel, and it can be seen that most parts of an electric field is localized within the microfluidic channel, thereby having strong interaction with a measured liquid.

Embodiment 2

Figure 4:
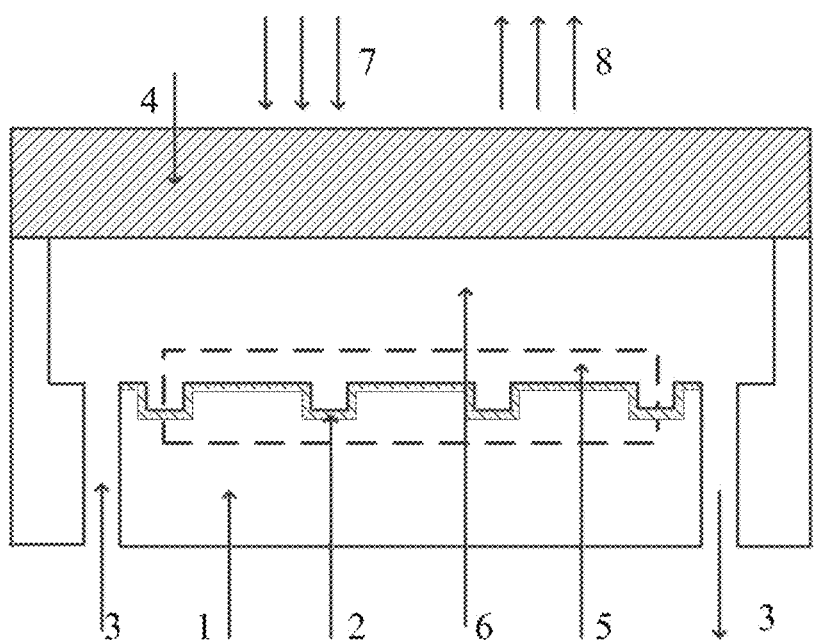
FIG. 4 is a schematic cross-sectional structural diagram of a sensor based on a grating slit waveguide composite structure according to Embodiment 2 of the present disclosure.
Figure 5:
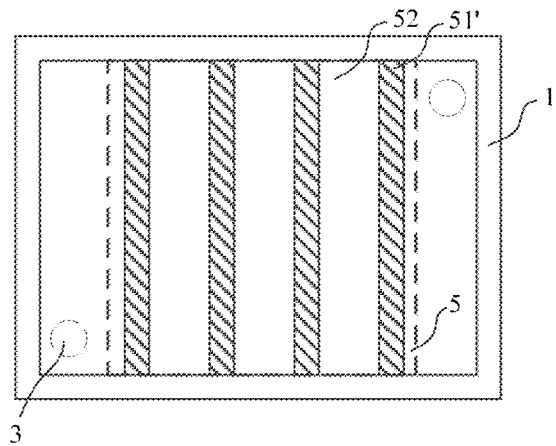
FIG. 5 is a schematic top plan structural diagram of the grating portion of FIG. 4.

Referring to FIGS. 4 and 5, as one of the forming methods of the above grating, the grating of the present embodiment is a reflective grating formed on the substrate. Specifically, a manufacturing process of the sensor based on the grating slit waveguide composite structure of the present embodiment is described as follows:

with reference to FIG. 4, a first groove of which a center portion is recessed is disposed on the surface of the substrate 1 of the present embodiment through micromachining; and the grating 5 is formed on the bottom surface of the first groove, wherein the grating 5 includes a plurality of third grooves 51' etched on the bottom surface of the first groove, and the plurality of third grooves 51' are disposed to be spaced apart from each other at an equal interval to form a reflective grating on the bottom surface of the first grooves of the substrate 1. The incident light 7 is subjected to reflecting to form the reflected light 8. Necessarily, a protrusion 52 is formed between each two adjacent third grooves 51', thus, a plurality of protrusions 52 with an equal interval therebetween are formed between the plurality of third grooves 51'.

The successive metal layer 2 is deposited on the formed grating 5, that is, the metal layer 2 successively covers the bottom surface of the first groove and groove surfaces of the third grooves. Through holes 3 penetrating through the substrate 1 are disposed at an edge of the bottom surface of the first groove, and the through holes 3 may be a liquid input port and an output port, respectively. Similarly, since the input port and the output port are used for inputting and outputting a measured liquid, they must communicate with the microfluidic channel 6, and a communicating mode may be performed with two manners: one is avoiding the input port and the output port while manufacturing the successive metal layer 2; and the other one may dispose the input port and the output port after the manufacturing of the successive metal layer 2 is completed and make the input port and the output port directly penetrate through the metal layer 2 to communicate with the microfluidic channel 6.

Finally, the dielectric layer 4 and the surface of the substrate 1 provided with the first groove face each other to be assembled together, and an interval is formed between the metal layer 2 and the dielectric layer 4, that is, the microfluidic channel 6 is formed, thereby completing the manufacturing of the entire sensor.

Preferably, referring to FIG. 4, the substrate 1 of the present embodiment may adopt silicon; the grating 5 is disposed on the bottom surface of the first groove of the substrate 1, has a height of 4 μm, adopts a one-dimensional periodic structure, and has a period of 160 μm, wherein in consideration of an error that may exist in the manufacturing process of the grating 5, assuming a grating strip is an isosceles trapezoid with a base angle of 60 degrees, a width of a lower bottom surface is 75 μm, and a width of an upper surface is 70.4 μm; a material of the metal layer 2 may adopt copper, has a thickness of 0.2 μm, and is conformally coated on a surface of the grating 5; a material of the dielectric layer 4 may adopt silicon and has a thickness of 30 μm, and the thin film of the dielectric layer 4 may be manufactured on the basis of a silicon sheet or a silicon-on-insulator (SOI); and a height of the microfluidic channel 6 is 30 μm.

Figure 6:
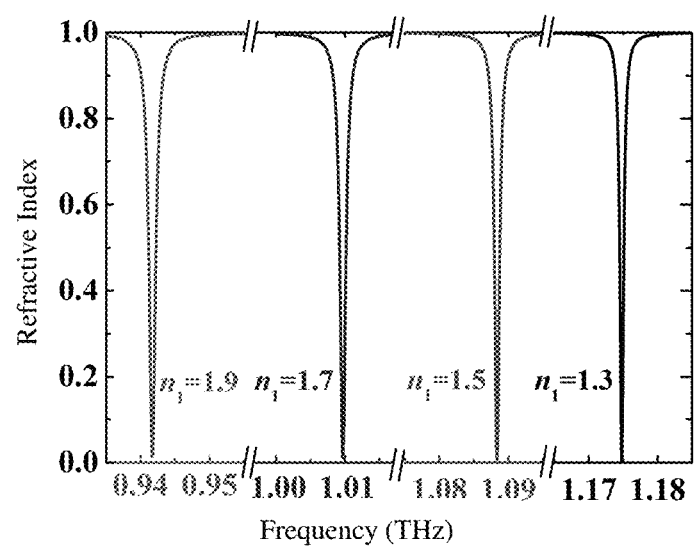
FIG. 6 is a transmission spectrum calculated by the sensor based on the grating slit waveguide composite structure according to Embodiment 2 of the present disclosure and corresponding to the measured liquids having different refractive indexes $n_1$.

FIG. 6 is a reflection spectrum calculated by the sensor of the present embodiment in the case where the measured liquids having different refractive indexes $n_1$ are in the microfluidic channel 6. It may be seen that there are very narrow resonance peaks in the reflection spectrum, and the quality factor thereof is above 1000. Through calculation (please refer to Embodiment 1 for the calculation manner), the frequency shift sensing sensitivity thereof when n=1.3 reaches 438 GHz/RIU, and a quality factor is 1879, thus, the FOM is up to 692. Moreover, it may be seen that when $n_1$ varies between 1.3 to 1.9, the reflection of a resonance peak reaches zero, and a thick metal film also ensures non-occurrence of transmission, thus, all the incident lights are localized in a sensor resonance structure, thereby implementing very strong interaction with the measured liquid. The high sensitivity within the greater refractive index measuring range is ensured while using a strength change as sensing application.

Embodiment 3

Figure 7:
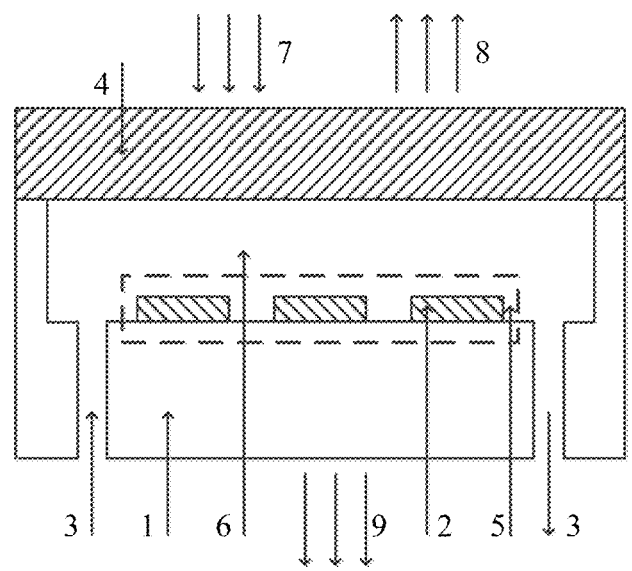
FIG. 7 is a schematic cross-sectional structural diagram of a sensor based on a grating slit waveguide composite structure according to Embodiment 3 of the present disclosure.
Figure 8:
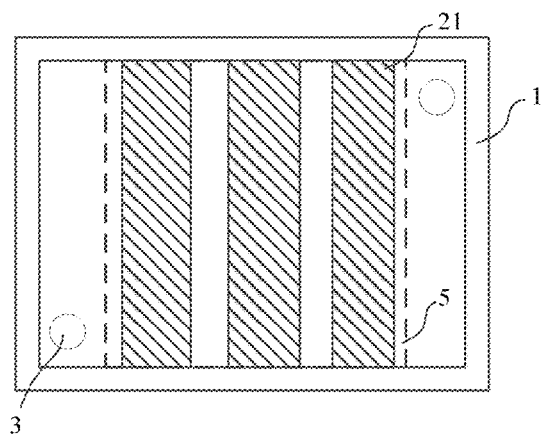
FIG. 8 is a schematic top plan structural diagram of the grating portion of FIG. 7.

Referring to FIGS. 7 and 8, as one of the forming methods of the above grating, the grating of the present embodiment is formed by a metal layer to form a one-dimensional metal grating, which is a transmission grating. Specifically, a manufacturing process of the sensor based on the grating slit waveguide composite structure of the present embodiment is described as follows:

with reference to FIG. 7, a first groove of which a center portion is recessed is disposed on the surface of the substrate 1 of the present embodiment through micromachining; and a metal layer 2 is formed on a bottom surface of the first groove of the substrate 1, wherein the metal layer 2 includes a plurality of metal strips 21 disposed to be spaced apart from each other at an equal interval, to form the metal grating 5.

Through holes 3 penetrating through the substrate 1 are disposed at an edge of the bottom surface of the first groove, and the through holes 3 may be a liquid input port and an output port, respectively. Similarly, since the input port and the output port are used for inputting and outputting a measured liquid, they must communicate with the microfluidic channel 6, and a communicating may be performed with two manners: one is avoiding the input port and the output port while manufacturing the successive metal layer 2; and the other one may dispose the input port and the output port after the manufacturing of the successive metal layer 2 is completed and make the input port and the output port directly penetrate through the metal layer 2 to communicate with the microfluidic channel 6.

Finally, the dielectric layer 4 and the surface of the substrate 1 face each other to be assembled together, and an interval is formed between the metal layer 2 and the dielectric layer 4, that is, the microfluidic channel 6 is formed, thereby completing the manufacturing of the entire sensor. The incident light 7 is reflected by the metal strip 21 to form the reflected light 8, and the incident light 7 is transmitted through an gap between the two metal strips 21 to form a transmission light 9.

Preferably, referring to FIG. 7, the substrate 1 of the present embodiment may adopt high-density polyethylene; the grating 5 is a metal grating and is formed by the metal layer 2 on the substrate 1, wherein a material of the metal layer 2 may adopt aluminum, has a thickness of 0.2 µm, adopts a one-dimensional periodic structure and has a period of 140 µm, and a width of the metal strip is 139 µm; a material of the dielectric layer 4 may adopt silicon and has a thickness of 30 µm, and the thin film may be manufactured on the basis of a silicon sheet or a silicon-on-insulator (SOI); and a height of the microfluidic channel 6 is 50 µm.

Figure 9A:
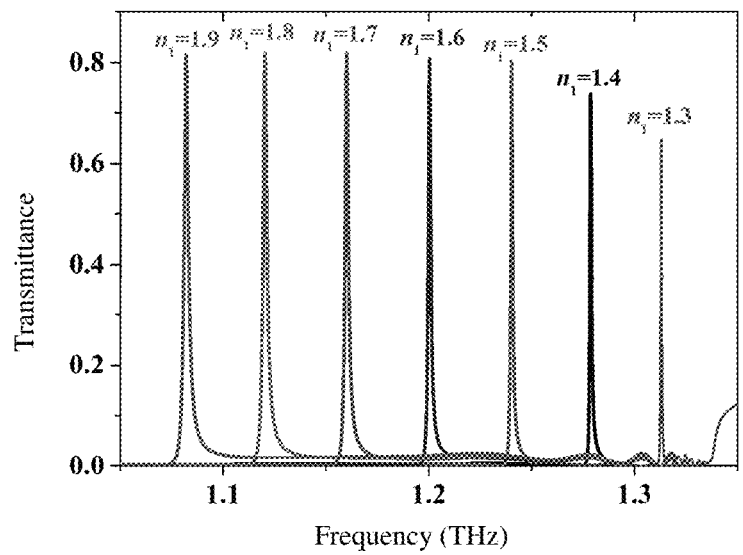
FIG. 9(a) is a transmission spectrum calculated by the sensor based on the grating slit waveguide composite structure according to Embodiment 3 of the present disclosure and corresponding to the measured liquids having different refractive indexes $n_1$.

FIG. 9 is a transmission spectrum calculated by the sensor of the present embodiment in the case where the measured liquids having different refractive indexes $n_1$ are in the microfluidic channel 6. It may be seen that there are very narrow resonance peaks in the transmission spectrum, and the quality factor thereof is above 1000. Through calculation, the frequency shift sensing sensitivity reaches 380 GHz/RIU, the quality factor is up to 2400, and the corresponding FOM is up to 180.

Figure 9B:
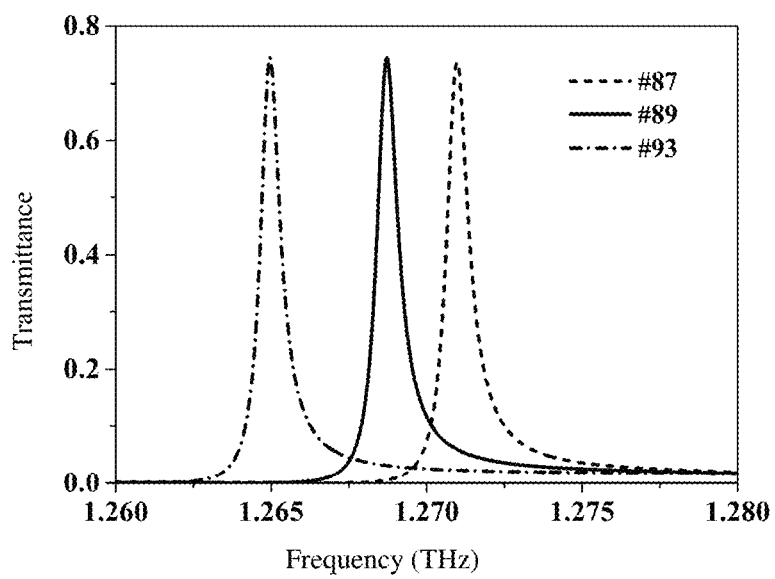
FIG. 9(b) is a transmission spectrum calculated by the sensor based on the grating slit waveguide composite structure according to Embodiment 3 of the present disclosure and corresponding to No. 87, No. 89 and No. 93 gasoline used as the measured liquids.

FIG. 9(b) is a transmission spectrum calculated by the sensor of the present embodiment in the case where No. 87, No. 89 and No. 93 gasoline are used as measure objects; and it may be seen that the transmission spectra of three kinds of gasoline have obvious differences, for example, a transmission strength of No. 87 gasoline has 74% difference from that of No. 89 gasoline at 1.27 THz, which is much greater than strength change of less than 1% of the metal nanohole sensor reported on page 3258 in Issue 7 of the journal of *Nature Nanotechnology* in 2012, and indicates potential application in oil exploration and detection.

Embodiment 4

Figure 10:
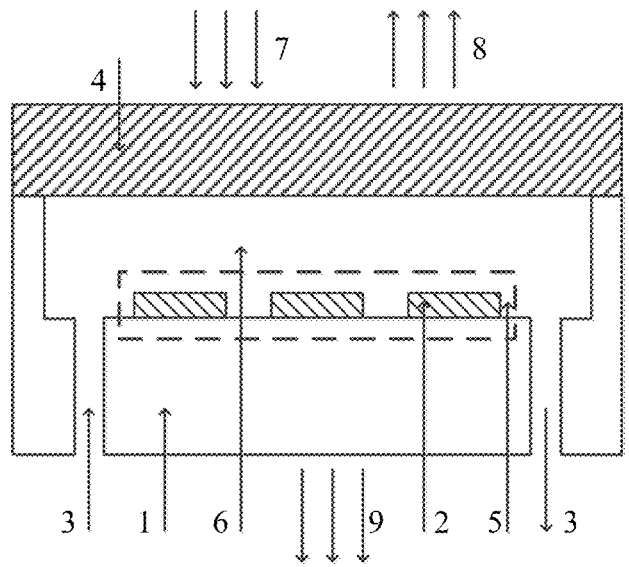
FIG. 10 is a schematic cross-sectional structural diagram of a sensor based on a grating slit waveguide composite structure according to Embodiment 4 of the present disclosure.
Figure 11:
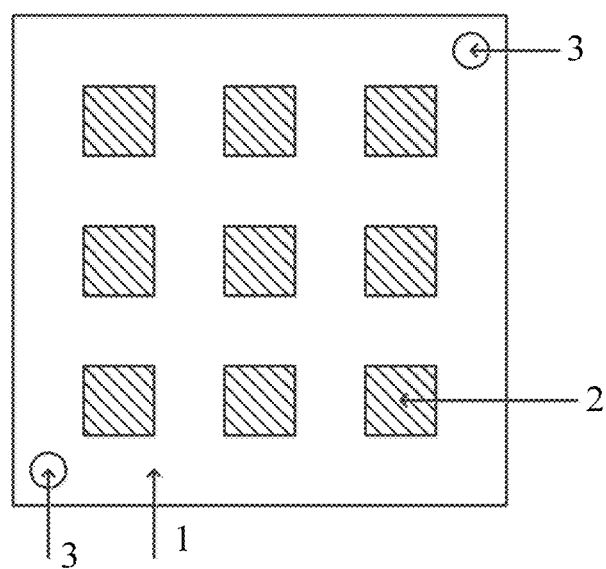
FIG. 11 is a schematic top plan structural diagram of the grating portion of FIG. 10.

Referring to FIGS. 10 and 11, as one of the forming methods of the above grating, the grating of the present embodiment is formed by a metal layer to form a two-dimensional metal grating. The present embodiment differs from Embodiment 3 merely in the grating formed in Embodiment 3 is in the one-dimensional structure, while the grating 5 formed in the present embodiment is in a two-dimensional structure. As for the forming of the two-dimensional structure, it just replaces the plurality of metal strips spaced apart from each other at the equal interval in Embodiment 3 with a plurality of metal blocks disposed to be spaced apart from each other at an equal interval, and the plurality of metal blocks are arranged in an array, thereby implementing a purpose of two-dimension.

Preferably, the substrate 1 of the present embodiment may adopt high-density polyethylene; the grating 5 is a metal grating formed by the metal layer 2, wherein a material of the metal layer 2 may adopt aluminum, has a thickness of 0.2 µm, adopts a two-dimensional periodic structure and has a period of 140 µm, and a width of the metal block is 139 µm; a material of the dielectric layer 4 may adopt silicon and has a thickness of 30 µm, and the thin film may be manufactured on the basis of a silicon sheet or a silicon-on-insulator (SOI); and a height of the microfluidic channel 6 is 50 µm.

Figure 12:
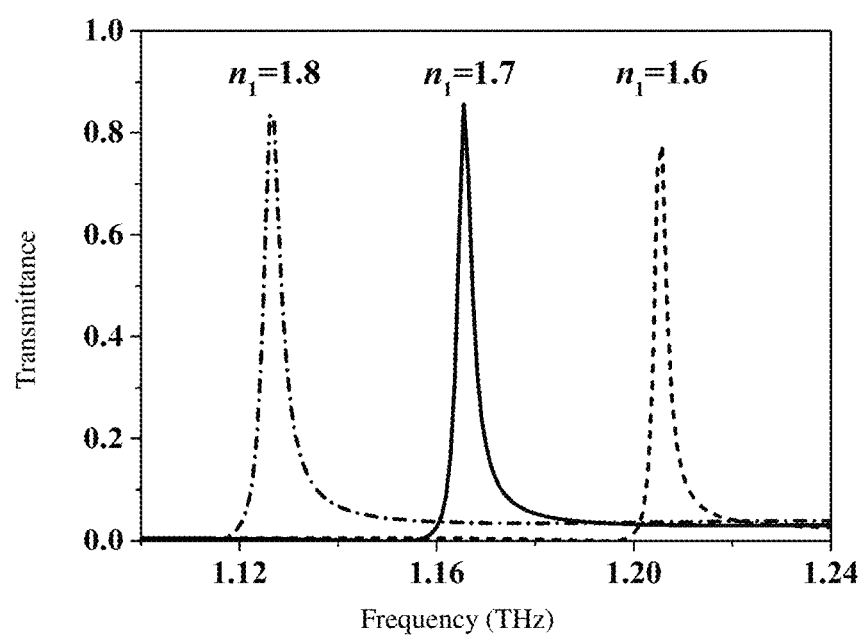
FIG. 12 is a transmission spectrum calculated by the sensor based on the grating slit waveguide composite structure according to Embodiment 4 of the present disclosure and corresponding to the measured liquids having different refractive indexes $n_1$.

FIG. 12 is a transmission spectrum calculated by the sensor of the present embodiment in the case where the measured liquids having different refractive indexes $n_1$ are respectively introduced into the microfluidic channel 6. It may be seen that there are very narrow resonance peaks in the transmission spectrum, and the quality factor thereof is above 1000. Through calculation, the frequency shift sensing sensitivity reaches 398 GHz/RIU, and the FOM is 140. The potential application in substance detection is indicated.

The sensor based on the grating slit waveguide composite structure of the present disclosure, by assembling the metal layer and the dielectric layer and forming a slit therebetween (i.e., an interval between the metal layer and the dielectric layer, that is, a microfluidic channel), obtains a slit optical waveguide having a light field highly localized in the slit, and uses the slit as a microfluidic channel through which a measured object flowing into and out, so that the highly localized light field sufficiently spatially overlaps, i.e., interacts with, the measured object, thereby improving the sensing sensitivity; meanwhile, the incident light and the mode of the slit optical waveguide are resonantly coupled by using the grating, resonant transmission or reflection with very low loss is implemented by adjusting the grating and the waveguide structure, thereby improving the quality factor. Finally, high sensing sensitivity and high quality factor are achieved in the same sensor structure, thereby achieving extremely high figure of merit.

The present disclosure discloses one or more of the preferred embodiments, and any changes or modifications thereof are derived from the technical concept of the present disclosure and are easily inferred by those skilled in the art without departing from the scope of patent right of the present disclosure. The given examples all work in a terahertz band, and can be completely extended to the infrared and visible light bands.

What is claimed is:
1. A sensor based on a grating slit waveguide composite structure, the sensor comprising:
    a substrate comprising a first surface and a second surface opposing to each other, the first surface being recessed to form a first groove, and the substrate further comprising at least two through holes penetrating through the second surface and a bottom surface of the first groove;
    a dielectric layer disposed to cover the first surface, and opposing to the first groove;

a metal layer disposed on the bottom surface of the first groove and avoiding openings of the through holes on the bottom surface of the first groove, wherein the dielectric layer, the metal layer and an interval between the dielectric layer and the metal layer form a slit optical waveguide; and a grating formed on the dielectric layer, or on the bottom surface of the first groove, or formed by the metal layer, wherein the grating is used to implement wave vector matching of an incident light with a mode of the slit optical waveguide.

2. The sensor of claim 1, wherein when the grating is formed on the dielectric layer, a surface of the dielectric layer facing against the first groove is provide with a plurality of second grooves, and the plurality of second grooves are disposed to be spaced apart from each other at an equal interval to form the grating.

3. The sensor of claim 2, wherein a material of the dielectric layer comprises at least one of silicon, gallium arsenide, quartz, polydimethylsiloxane, polypropylene, polyethylene, polytetrafluoroethylene, polymethylpentene and polyimide.

4. The sensor of claim 2, wherein a material of the metal layer comprises at least one of gold, silver, copper, aluminum, titanium, nickel, and chromium; and/or a thickness of the metal layer is 0.05 µm~0.5 µm.

5. The sensor of claim 2, wherein an interval between the dielectric layer and the metal layer is 0.01 to 0.2 times an operating wavelength of the sensor.

6. The sensor of claim 1, wherein when the grating is formed on the bottom surface of the first groove, the bottom surface of the first groove is provide with a plurality of third grooves, the plurality of third grooves are disposed to be spaced apart from each other at an equal interval to form the grating, and the metal layer successively covers the bottom surface of the first groove and groove surfaces of the third grooves.

7. The sensor of claim 6, wherein a material of the dielectric layer comprises at least one of silicon, gallium arsenide, quartz, polydimethylsiloxane, polypropylene, polyethylene, polytetrafluoroethylene, polymethylpentene and polyimide.

8. The sensor of claim 6, wherein a material of the metal layer comprises at least one of gold, silver, copper, aluminum, titanium, nickel, and chromium; and/or a thickness of the metal layer is 0.05 µm~0.5 µm.

9. The sensor of claim 6, wherein an interval between the dielectric layer and the metal layer is 0.01 to 0.2 times an operating wavelength of the sensor.

10. The sensor of claim 1, wherein when the grating is formed by the metal layer, the metal layer comprises a plurality of metal blocks disposed on the bottom surface of the first groove, and the plurality of metal blocks are disposed to be spaced apart from each other at an equal interval to form the grating.

11. The sensor of claim 10, wherein a material of the substrate comprises at least one of quartz, polydimethylsiloxane, polypropylene, polyethylene, polytetrafluoroethylene, polymethylpentene, and polyimide.

12. The sensor of claim 10, wherein a material of the dielectric layer comprises at least one of silicon, gallium arsenide, quartz, polydimethylsiloxane, polypropylene, polyethylene, polytetrafluoroethylene, polymethylpentene and polyimide.

13. The sensor of claim 10, wherein a material of the metal layer comprises at least one of gold, silver, copper, aluminum, titanium, nickel, and chromium; and/or a thickness of the metal layer is 0.05 µm~0.5 µm.

14. The sensor of claim 10, wherein an interval between the dielectric layer and the metal layer is 0.01 to 0.2 times an operating wavelength of the sensor.

15. The sensor of claim 1, wherein the grating has a one-dimensional periodic structure or a two-dimensional periodic structure.

16. The sensor of claim 15, wherein a grating period of the grating is 0.2 to 2 times an operating wavelength of the sensor; and/or a thickness of the grating is 0.03 µm~10 µm.

17. The sensor of claim 1, wherein when the grating is formed on the dielectric layer or the grating is formed on the bottom surface of the first groove, the metal layer covers a remaining portion of the bottom surface of the first groove except the openings.

* * * * *